(12) United States Patent
Meister et al.

(10) Patent No.: US 9,452,838 B2
(45) Date of Patent: Sep. 27, 2016

(54) INDEPENDENTLY ARTICULATING SEAT PAN FOR AIRCRAFT SEAT

(71) Applicant: B/E Aerospace, Inc., Wellington, FL (US)

(72) Inventors: Peter C. Meister, Miami, FL (US); Aravinda Mahabaleshwara, Bangalore (IN)

(73) Assignee: B/E Aerospace, Inc., Wellington, FL (US)

( * ) Notice: Subject to any disclaimer, the term of this patent is extended or adjusted under 35 U.S.C. 154(b) by 59 days.

(21) Appl. No.: 14/518,619

(22) Filed: Oct. 20, 2014

(65) Prior Publication Data

US 2015/0108804 A1    Apr. 23, 2015

Related U.S. Application Data

(60) Provisional application No. 61/893,493, filed on Oct. 21, 2013.

(51) Int. Cl.
*B64D 11/06*    (2006.01)
*B60N 2/10*    (2006.01)

(52) U.S. Cl.
CPC .............. *B64D 11/06* (2013.01); *B60N 2/10* (2013.01); *B64D 11/064* (2014.12); *B64D 2011/0606* (2013.01)

(58) Field of Classification Search
CPC ........................................................ B60N 2/10
USPC ........ 297/344.14, 313, 322, 337, 69, 423.26
See application file for complete search history.

(56) References Cited

U.S. PATENT DOCUMENTS

| | | | | |
|---|---|---|---|---|
| 4,334,709 A * | 6/1982 | Akiyama | ................. | B60N 2/62 297/284.11 |
| 4,915,447 A | 4/1990 | Shovar | | |
| 5,064,146 A | 11/1991 | Tung | | |
| 5,261,723 A * | 11/1993 | Hosoe | ................... | A47C 3/0257 297/322 |
| 5,636,884 A * | 6/1997 | Ladetto | .................... | B60N 2/06 296/65.09 |
| 6,237,994 B1 * | 5/2001 | Bentley | .................. | A47C 1/023 297/118 |
| 6,340,208 B1 * | 1/2002 | Habedank | ................ | B60N 2/02 297/322 |
| 6,641,214 B2 * | 11/2003 | Veneruso | ............. | B60N 2/0232 297/216.15 |
| 7,093,897 B2 * | 8/2006 | Terrand | .................... | B60N 2/26 297/284.11 |
| 7,909,401 B2 * | 3/2011 | Hofmann | ............. | B60N 2/0284 297/284.11 |
| 8,523,280 B2 * | 9/2013 | Kuno | ................... | B60N 2/2209 297/322 |

(Continued)

FOREIGN PATENT DOCUMENTS

DE    101 09 526 A1    9/2002
DE    20 2012 003007 U1    6/2013

OTHER PUBLICATIONS

European Patent Office International Search Report for International Patent Application No. PCT/US2014/061376 dated Jan. 7, 2015.

*Primary Examiner* — Timothy J Brindley
(74) *Attorney, Agent, or Firm* — Shumaker, Loop & Kendrick, LLP

(57) ABSTRACT

A seat pan assembly including a fixed seat pan frame defining a substantially horizontal forward portion and a rear portion at an angle to horizontal, and a seat pan pivotally supported on the fixed seat pan frame, the seat pan having a pivot axis established through a width of the seat pan such that the seat pan is free to pivot relative to the fixed seat pan frame between substantially horizontal and an angle to horizontal. An aircraft passenger seat including a seat pan assembly adapted to adjust independent of seatback recline motion.

19 Claims, 3 Drawing Sheets

(56) References Cited

U.S. PATENT DOCUMENTS

| | | | | |
|---|---|---|---|---|
| 8,733,840 B2* | 5/2014 | Westerink | ............ | B64D 11/06 297/316 |
| 8,827,365 B2* | 9/2014 | Gaither | ............ | B60N 2/242 297/316 |
| 9,016,784 B2* | 4/2015 | Line | ............ | B60N 2/0284 297/284.11 |
| 9,061,766 B2* | 6/2015 | Kladde | ............ | B64D 11/06 |
| 2005/0046259 A1* | 3/2005 | Schurg | ............ | B60N 2/0292 297/354.12 |
| 2005/0082889 A1* | 4/2005 | Tsai | ............ | A47C 1/022 297/337 |
| 2009/0224585 A1 | 9/2009 | Bokelmann | | |
| 2010/0194169 A1* | 8/2010 | Shinozuka | ............ | B60N 2/4495 297/423.26 |
| 2010/0308167 A1* | 12/2010 | Hawkins | ............ | B60N 2/181 244/122 R |
| 2012/0181838 A1* | 7/2012 | Wu | ............ | A47C 7/506 297/423.2 |
| 2014/0103688 A1* | 4/2014 | Wilson | ............ | A47C 1/03211 297/284.7 |
| 2014/0191550 A1* | 7/2014 | Katoh | ............ | B60N 2/48 297/337 |
| 2015/0108817 A1* | 4/2015 | Meister | ............ | B64D 11/0648 297/423.26 |

* cited by examiner

INDEPENDENTLY ARTICULATING SEAT PAN FOR AIRCRAFT SEAT

CROSS-REFERENCE TO RELATED APPLICATION

This application claims priority from U.S. Patent Application No. 61/893,493 filed Oct. 21, 2013, the entirety of which is incorporated by reference herein.

TECHNICAL FIELD AND BACKGROUND OF THE INVENTION

The present invention relates generally to an aircraft passenger seat having an independently moveable seat pan, and more particularly, to a seat pan configured to pivot independent of seatback and/or seat frame motion as a seated passenger's weight is shifted relative to a pivot point of the seat pan.

Conventional aircraft seat pans are typically linked with seatback or backrest motion such that the angle and/or of the seat pan changes as the seatback reclines. To achieve simultaneous movement of the seat pan and seatback, the two are typically linked such that the forward edge of the seat pan is driven forward and upward as the seatback reclines. Translational and rotational movement of the seat pan is provided by way of seat pan lifters that articulate, or by cams that guide the change in angle of the seat pan. In either arrangement, there is no independent movement of the seat pan nor independent locking of the seat pan at a variety of angles, and therefore no way to allow the passenger to choose a seat pan angle for maximum comfort without moving any other part of the seat.

Accordingly, to increase the adjustability of a passenger seat in order to enhance seating comfort, what is needed is an aircraft passenger seat in which each of the seating surfaces of the seat (e.g., seatback, seat pan and legrest) are independently adjustable.

BRIEF SUMMARY OF THE INVENTION

It is therefore an object of the present invention to provide an aircraft passenger seat having a seat pan configured to adjust independently of the seat frame and seatback motion of the seat, thereby providing greater seat adjustability than previously achievable in conventional seats.

It is another object of the invention to provide an aircraft passenger seat having an independently adjustable seatback and seat pan.

It is another object of the invention to provide an aircraft passenger seat having an independently adjustable seat pan, seatback, legrest, and in some applications an independently adjustable seat frame.

It is another object of the invention to disconnect seat pan motion from the seatback recline motion typically linked in recline-capable aircraft passenger seats.

It is another object of the invention to provide an aircraft passenger seat having a seat pan supported on and configured to pivot relative to an underlying seat frame.

It is another object of the invention to provide a seat pan having a pivot point established through the width of the seat pan at a location between the center and most forward edge of the seat pan, the pivot point supported by left-side and right-side seat rails such that the seat pan is free to pivot relative to the fixed seat rails from about zero degrees (i.e., horizontal or nearly horizontal to the floor) to about twenty degrees from the floor.

It is another object of the invention to provide a seat pan assembly wherein the seat pan rails of the assembly are shaped to define/limit the range of movement of the seat pan supported on the rails.

It is another object of the invention to provide a seat pan wherein the passenger's center of gravity is shifted aft of the pivot point of the seat pan to move the seat pan down in the back and up in the front (i.e., incline the seat pan), and is shifted forward of the pivot point to move the seat pan angle toward zero degrees (i.e., horizontal or near horizontal), or to a predetermined angle.

It is another object of the invention to provide an independently adjustable seat pan having a mechanism for locking the seat pan at any predetermined angle throughout the range of motion of the seat pan.

It is another object of the invention to provide an independently adjustable seat pan having an actuator for returning the seat pan positioned at an angle to horizontal or near horizontal.

To achieve the foregoing and other objects and advantages, provided herein is a seat pan assembly including a fixed seat pan frame defining a substantially horizontal forward portion and a rear portion at an angle to horizontal, and a seat pan pivotally supported on the fixed seat pan frame, the seat pan having a pivot axis established through a width of the seat pan such that the seat pan is free to pivot relative to the fixed seat pan frame between substantially horizontal and an angle to horizontal.

In another aspect, the fixed seat pan frame may include parallel, spaced left-side and right-side rails, each of the left-side and right-side rails defining the substantially horizontal forward portion and the rear portion at an angle to horizontal.

In another aspect, the left-side and right-side rails may be shaped to limit the pivoting range of motion of the seat pan relative to the fixed seat pan frame.

In another aspect, the pivot axis may be supported by the left-side and right-side seat rails.

In another aspect, a seated passenger's center of gravity may be shifted aft of the pivot axis of the seat pan to incline the seat pan, and may be shifted forward of the pivot axis to move the seat pan angle toward horizontal.

In another aspect, the pivot axis may be established at a position between a center and a forward edge of the seat pan.

In another aspect, the seat pan may be adapted to pivot relative to the fixed seat pan frame independent of seatback motion of a seat upon which the seat pan assembly is installed.

In another aspect, the seat pan assembly may be adapted to be supported on a fixed seat frame of an aircraft passenger seat.

In another aspect, the seat pan may be configured to pivot relative to the fixed seat pan frame between horizontal and 20 degrees from horizontal.

In another aspect, the seat pan assembly may further include a lock for locking an angle of the seat pan relative to the fixed seat pan frame and an actuator for returning the seat pan to substantially horizontal.

In another aspect, the seat pan assembly may include a legrest linearly deployable from a front of the fixed seat pan frame, the legrest pivotally supported on ends of parallel support members.

In another aspect, the seat pan may be constructed from sheet metal bent to define parallel, spaced left and right sides and a forward portion interconnecting the left and right sides and arranged perpendicular thereto.

In another embodiment, the present invention provide an aircraft passenger seat including a fixed seat frame, a seatback pivotally attached at one end to the fixed seat frame, the seatback configured to pivot relative to the fixed seat frame between upright and reclined positions, and a seat pan assembly configured to pivot relative to the fixed seat frame independent of pivoting motion of the seatback, the seat pan assembly including a fixed seat pan frame defining a substantially horizontal forward portion and a rear portion at an angle to horizontal, and a seat pan pivotally supported on the fixed seat pan frame, the seat pan having a pivot axis established through a width of the seat pan such that the seat pan is free to pivot relative to the fixed seat pan frame between substantially horizontal and an angle to horizontal.

In another aspect, the fixed seat pan frame may include parallel, spaced left-side and right-side rails, each of the left-side and right-side rails defining the substantially horizontal forward portion and the rear portion at an angle to horizontal.

In another aspect, the left-side and right-side rails may be shaped to limit the pivoting range of motion of the seat pan relative to the fixed seat pan frame.

In another aspect, a seated passenger's center of gravity may be shifted aft of the pivot axis of the seat pan to incline the seat pan, and may be shifted forward of the pivot axis to move the seat pan angle toward horizontal.

In another aspect, the pivot axis may be established at a position between a center and a forward edge of the seat pan.

In another aspect, the seat pan may be configured to pivot relative to the fixed seat pan frame between horizontal and 20 degrees from horizontal.

In another aspect, the seat may further include a lock for locking an angle of the seat pan relative to the fixed seat pan frame and an actuator for returning the seat pan to substantially horizontal.

In another aspect, the seat may further include a legrest linearly deployable from a front of the fixed seat pan frame, the legrest pivotally supported on ends of parallel support members.

Embodiments of the invention can include one or more or any combination of the above features, aspects and configurations.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

Features, aspects and advantages of the present invention are understood when the following detailed description of the invention is read with reference to the accompanying drawings, in which.

DETAILED DESCRIPTION OF THE INVENTION

Figure 1:
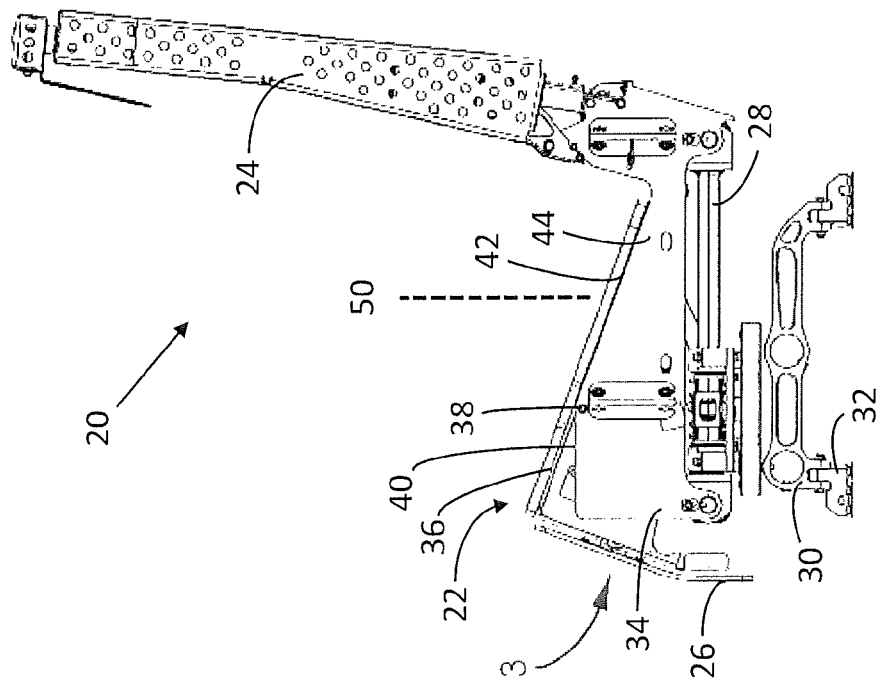
FIG. 1 is a side view of an aircraft passenger seat having an independently adjustable seat pan according to an embodiment of the invention, and showing the seat pan in a horizontal position.

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, embodiments of a seat pan assembly and aircraft passenger seat including the same are shown and described. The seat pan is generally adapted to adjust by pivoting independent of seatback motion, and independent of seat frame motion in applications in which the seat frame is adjustable. A pivot axis is established between the center and most forward edge of the seat pan about which the seat pan pivots between a horizontal (or near horizontal) position and an angle to horizontal. When the seated passenger's weight (i.e., center of gravity) is shifted aft of the pivot axis the seat pan pivots down in the back and up in the front, resulted in an inclined seat pan position. When the seated passenger's weight (i.e., center of gravity) is shifted forward of the pivot axis the seat pan moves to a horizontal or generally horizontal seat pan position. The seat pan can be locked at any angle between horizontal and full tilt by way of a locking mechanism, thus selective and stepless adjustability is achievable. The seat pan assembly may further include an actuator, such as a gas spring, for retuning the seat pan to horizontal.

Referring to FIGS. 1-4, an aircraft passenger seat including a seat pan assembly according to the present invention is shown generally at reference numeral 20. The aircraft passenger seat shown, referred to herein as the "seat," is a non-limiting example of a seat configuration adapted for use with the seat pan assembly. The seat 20 generally includes the seat pan assembly 22, a recline-capable seatback 24, an optional deployable legrest 26, and a seat frame 28. The seat frame 28 includes legs 30 adapted to attached to seat tracks in the floor by way of conventional track fasteners 32. The seat 20 may be a stand-alone seat or may be one seat of a row of seats that share common frame elements. The seating surfaces, such as the seat pan, seatback and legrest may be covered with foam padding and upholstery for comfort and aesthetics.

The seatback 24 may move between an upright sitting position for taxi, take-off and landing and a reclined sitting position, and even a horizontal lie-flat sleeping position. Seatback motion may be actuator controlled in both directions or may include a single actuator for facilitating return to the upright position when force on the seatback is removed or lessened, such as when the passenger leans forward. The position of the seatback may be locked at any angle along the full range of motion to provide an infinite range of adjustability and maximum comfort. The seat pan assembly 22 is configured to adjust independent of seat frame movement and independent of seatback movement, and therefore the configuration of the seatback and reclining movement thereof is inconsequential to the present invention. The seatback 24 may thus be configured to recline, however, is not required to recline.

Figure 2:
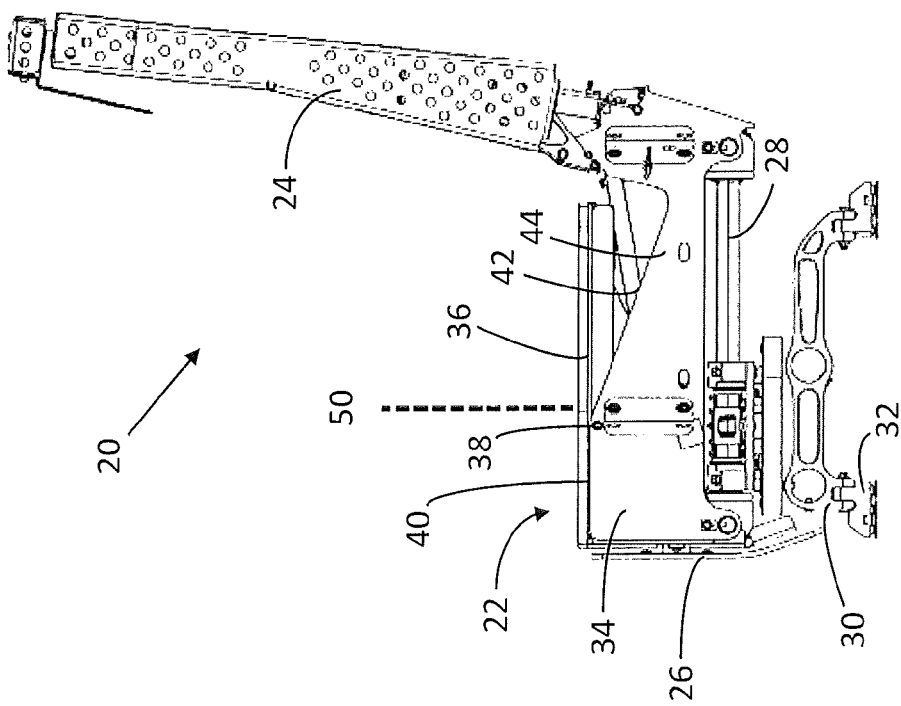
FIG. 2 is a side elevation view of the seat of FIG. 1 showing the seat pan at angle to horizontal.

The seat pan assembly 22 is configured to adjust independent of seatback motion, as well as independent of seat frame adjustability in applications in which the seat frame is adjustable. The seat pan assembly 22 generally includes a fixed seat pan frame 34 and a seat pan 36 pivotally supported on the fixed seat pan frame. The seat pan 36 has a pivot axis 38 established through a width thereof about which the seat pan is free to pivot relative to the fixed seat pan frame between substantially horizontal or near horizontal and an angle to horizontal. FIG. 1 shows the seat pan 36 in the horizontal position or near horizontal position, while FIG. 2 shows the seat pan 36 in the fully reclined sitting position in which the forward end is raised and the rear end is lowered, thus achieving an inclined sitting position. As used herein, the term "horizontal" is intended to include parallel to the horizon as well as parallel to the floor.

The fixed seat pan frame 34 includes frame components that define a substantially horizontal forward portion 40 and rear portion 42 at an angle to horizontal that engage the underside of the seat pan (i.e., surfaces that the seat pan sit on) to limit movement of the seat pan. In the particular embodiment shown, the seat pan frame components defining the substantially horizontal forward portion 40 and angled rear portion 42 include spaced, parallel left-side and right-side rails 44, 46 interconnected through at least one transverse bridging member 48. The shape of the frame components, and in particular the left-side and right-side rails 44, 46 define and/or limit the pivoting range of motion of the seat pan 36. Specifically, the forward end of the top of the rails 44, 46 is substantially horizontal such that the forward end of the seat pan 36 is prevented from pivoting downward past horizontal, and the rear end of the rails are at an angle to horizontal such that the rear end of the seat pan is prevented from pivoting downward beyond the rails. The shape of the rails 44, 46 may thus be customized to control the degree of pivoting movement of the seat pan 36.

As shown, the pivot axis 38 is established at a position between a center and a forward edge of the seat pan 36, and the total range of movement is from horizontal or near horizontal to about 20 degrees from horizontal. Other ranges of motion include, but are not limited to, 0 degrees to 45 degrees, more preferably from 0 degrees to 30 degrees.

Comparing FIGS. 1 and 2, the seat pan 36 pivots relative to the underlying fixed seat pan frame 34 depending on the position of the center of gravity of the seated passenger about the pivot axis 38. As shown in FIG. 1, the passenger's center of gravity (i.e., weight), indicated at reference numeral 50, is shifted forward of the pivot axis 38 to move the seat pan angle toward horizontal. As shown in FIG. 2, the passenger's center of gravity 50 is shifted aft of the pivot axis 38 of the seat pan to incline the seat pan. Thus, the angle of the seat pan 36 is adjusted by the passenger by shifting his/her weight relative to the pivot axis 38, although it is envisioned that pivoting movement may be actuator controlled in an alternative embodiment.

Figure 4:
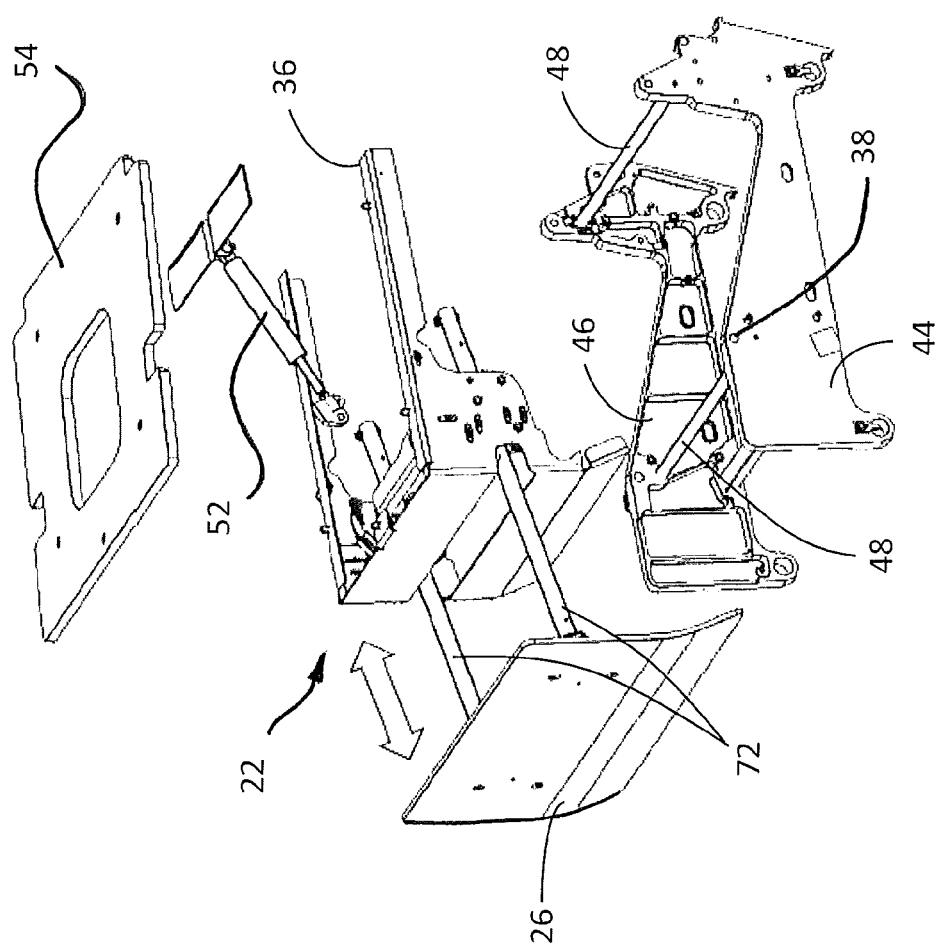
FIG. 4 is an exploded view of the seat pan assembly further including a legrest that deploys linearly from the front of the seat pan.

Referring to FIG. 4, a locking gas spring 52 or other actuator arranged beneath the seat pan 36 is provided to lock the seat pan 36 at any predetermined angle relative to the fixed seat pan frame 34. The locking gas spring 52 is arranged to load when the seat pan 36 pivots away from horizontal, and releases to return the seat pan to horizontal in the absence of a load on the seat pan, such as when the passenger leaves the seat. One end of the locking gas spring 52 attaches to the fixed seat frame 34, while the opposing end attaches to the seat pan 36 or flame resistant panel 54 attached thereto, such as a Nomex® panel.

Figure 3:
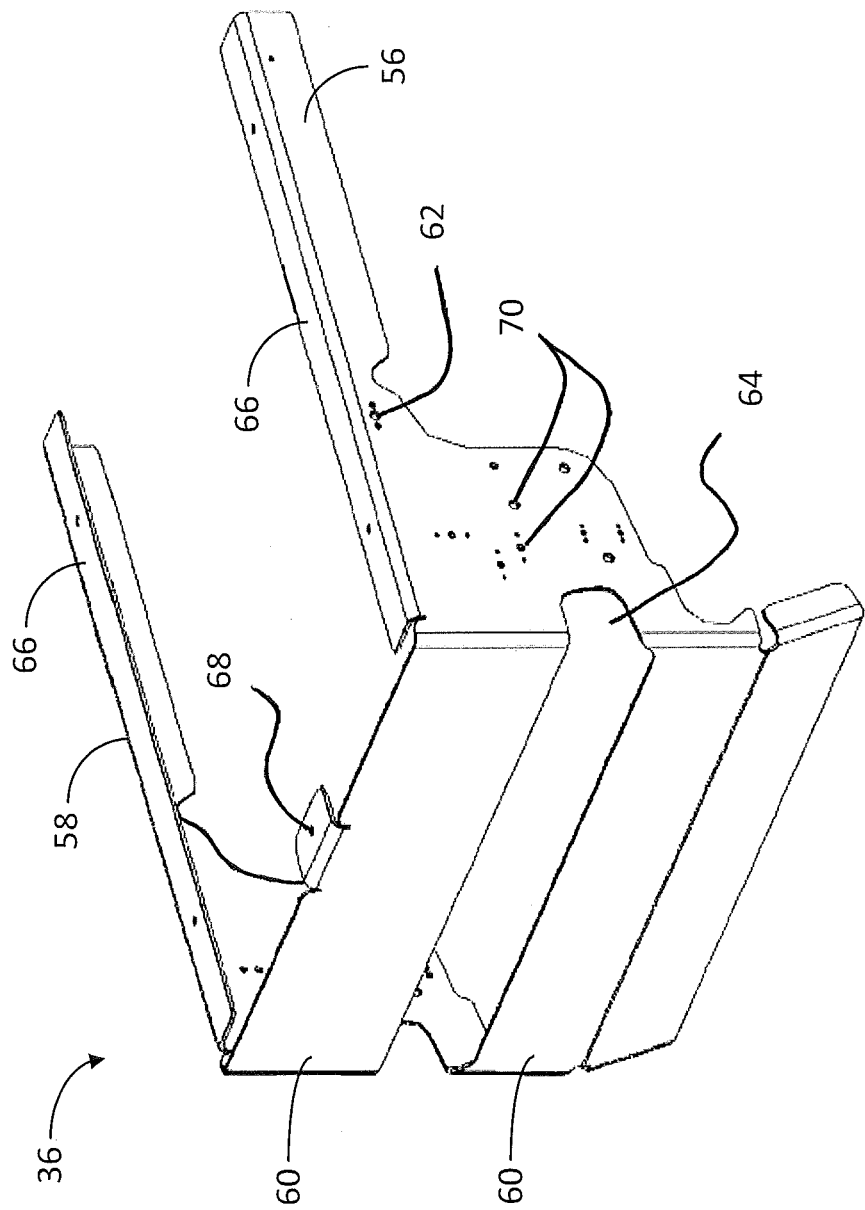
FIG. 3 is an isometric view of the seat pan.

Referring to FIG. 3, the seat pan 36 may be constructed from sheet metal bent to define left and right sides 56, 58 interconnected through one or more transverse front portions 60. The seat pan 36 pivotally attaches to the fixed seat frame at pivot holes 62. The seat pan 36 defines an elongate horizontal opening 64 at the front end for receiving legrest support members therethrough, such as the linearly deploying legrest support members shown in FIG. 4. Horizontal flanges 66 are directed inward along the top edge of both the left and right sides of the seat pan for seating and attaching the flame resistant seat panel 54 to make a box structure. A horizontal flange 68 may be provided at the front end of the top of the seat pan with a hole therethrough for attaching the seat panel 54. A plurality of holes 70 may be provided closer to the forward end of the left and right sides of the set pan for attaching leg rest guiding posts and/or other leg rest structure.

Referring to FIG. 4, the seat pan assembly 22 may include a linearly deployable legrest 26 pivotally attached to the ends of parallel tubular support members 72. The tubular support members 72 deploy from within the seat pan assembly to drive the legrest 26 forward from the front of the seat. The legrest 26 deploys to a distance from the front of the seat, thereby providing support for the passenger's lower legs and feet in an elevated position at a distance from the seat pan 36. As shown, the legrest 26 may define two supporting surfaces at an angle to each other to comfortably provide support beneath the ankles by conforming to the passenger's anatomy. The legrest 26 may deploy independent of seat pan movement or cooperatively therewith. The angle of deployment of the legrest may be dependent on the seat pan angle, thus when the seat pan is substantially horizontal the legrest deploys at an angle below horizontal, and when the seat pan is inclined the legrest deploys at an angle above horizontal.

One end of each of the tubular support members tubes 72 may be attached to pivot brackets attached to the backside of the legrest 26 such that the legrest pivots about the ends of the support members between near vertical and near horizontal. A torsion spring may be utilized at the connection of the legrest and pivot brackets to bias the legrest toward the vertical position. The torsion spring may store mechanical energy as the legrest is urged toward horizontal, thereby returning the legrest to near vertical for stowing when the passenger's legs/feet are removed from the legrest. The opposing ends of support members are unattached to allow linear movement.

The seat pan assembly 22 disclosed herein allows for independent seat pan articulation, meaning that the seat pan is free to move independent of the frame and independent of seatback motion. This allows the passenger to select an optimum seat pan angle for comfort by shifting his/her weight with respect to the pivot axis of the seat pan, and by locking the seat pan at the desired angle.

The foregoing description provides embodiments of the invention by way of example only. It is envisioned that other embodiments may perform similar functions and/or achieve similar results. Any and all such equivalent embodiments and examples are within the scope of the present invention and are intended to be covered by the appended claims.

What is claimed is:

1. A seat pan assembly, comprising:
a fixed seat pan frame defining a substantially horizontal forward portion and a rear portion at an angle to horizontal; and
a seat pan pivotally supported on the fixed seat pan frame, the seat pan having a pivot axis established through a width of the seat pan such that the seat pan is free to pivot relative to the fixed seat pan frame between substantially horizontal and an angle to horizontal;
wherein a forward end of the seat pan directly engages the substantially horizontal forward portion of the fixed seat pan frame when the seat pan is substantially horizontal and a rearward end of the seat pan directly engages the rear portion of the fixed seat pan frame when the seat pan is at an angle to horizontal, and wherein the rear portion of the fixed seat pan frame dictates the seat pan angle to horizontal and the substantially horizontal forward portion of the fixed seat pan frame prevents the forward end of the seat pan from pivoting downward past substantially horizontal.

2. The seat pan assembly of claim 1, wherein the fixed seat pan frame comprises parallel, spaced left-side and right-side rails, each of the left-side and right-side rails defining the substantially horizontal forward portion and the rear portion at an angle to horizontal.

3. The seat pan assembly of claim 2, wherein the left-side and right-side rails are shaped to dictate the pivoting range of motion of the seat pan relative to the fixed seat pan frame.

4. The seat pan assembly of claim 2, wherein the pivot axis is supported by the left-side and right-side seat rails.

5. The seat pan assembly of claim 1, wherein an object's center of gravity is shifted aft of the pivot axis of the seat pan to incline the seat pan, and is shifted forward of the pivot axis to move the seat pan angle toward horizontal.

6. The seat pan assembly of claim 1, wherein the pivot axis is established at a position between a center and a forward edge of the seat pan.

7. The seat pan assembly of claim 1, wherein the seat pan is adapted to pivot relative to the fixed seat pan frame independent of seatback motion of a seat upon which the seat pan assembly is installed.

8. The seat pan assembly of claim 1, wherein the seat pan assembly is adapted to be supported on a fixed seat frame of an aircraft passenger seat.

9. The seat pan assembly of claim 1, wherein the seat pan is configured to pivot relative to the fixed seat pan frame between horizontal and 20 degrees from horizontal.

10. The seat pan assembly of claim 1, further comprising a lock for locking an angle of the seat pan relative to the fixed seat pan frame and an actuator for returning the seat pan to substantially horizontal.

11. The seat pan assembly of claim 1, further comprising a legrest linearly deployable from a front of the seat pan, the legrest pivotally supported on ends of parallel support members.

12. The seat pan assembly of claim 1, wherein the seat pan is constructed from sheet metal bent to define spaced, parallel left and right sides and a forward portion interconnecting the left and right sides and arranged perpendicular thereto.

13. An aircraft passenger seat, comprising:
a fixed seat frame including parallel, spaced left-side and right-side rails each defining a substantially horizontal forward portion and a rear portion at an angle to horizontal;
a seatback pivotally attached at one end to the fixed seat frame, the seatback configured to pivot relative to the fixed seat frame between upright and reclined positions; and
a seat pan frame configured to pivot relative to the underlying fixed seat frame independent of pivoting motion of the seatback, the seat pan frame having a pivot axis established through a width thereof such that the seat pan frame is free to pivot relative to the fixed seat frame between substantially horizontal and an angle to horizontal;
wherein a forward end of the seat pan frame directly engages the substantially horizontal forward portion of the fixed seat frame when the seat pan frame is substantially horizontal and a rearward end of the seat pan frame directly engages the rear portion of the fixed seat frame when the seat pan frame is at an angle to horizontal, and wherein the rear portion of the fixed seat frame dictates the seat pan frame angle to horizontal and the substantially horizontal forward portion of the fixed seat frame prevents the forward end of the seat pan frame from pivoting downward past substantially horizontal.

14. The aircraft passenger seat of claim 13, wherein the left-side and right-side rails are shaped to dictate the pivoting range of motion of the seat pan frame relative to the fixed seat frame.

15. The aircraft passenger seat of claim 13, wherein an object's center of gravity is shifted aft of the pivot axis of the seat pan frame to incline the seat pan frame, and is shifted forward of the pivot axis to move the seat pan frame angle toward horizontal.

16. The aircraft passenger seat of claim 13, wherein the pivot axis is established at a position between a center and a forward edge of the seat pan frame.

17. The aircraft passenger seat of claim 13, wherein the seat pan frame is configured to pivot relative to the fixed seat frame between horizontal and 20 degrees from horizontal.

18. The aircraft passenger seat of claim 13, further comprising a lock for locking an angle of the seat pan frame relative to the underlying fixed seat frame and an actuator for returning the seat pan frame to substantially horizontal.

19. The aircraft passenger seat of claim 13, further comprising a legrest linearly deployable from a front of the seat pan frame, the legrest pivotally supported on ends of parallel support members.

* * * * *